Jan. 1, 1957   E. WILDHABER   2,775,922
METHOD AND MACHINE FOR MAKING GEARS
Filed May 25, 1951   2 Sheets-Sheet 2
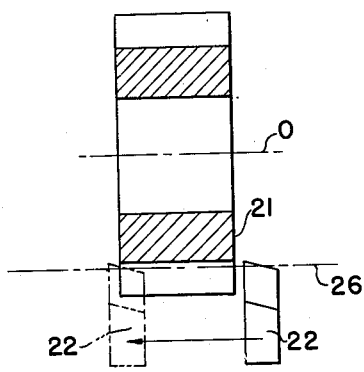
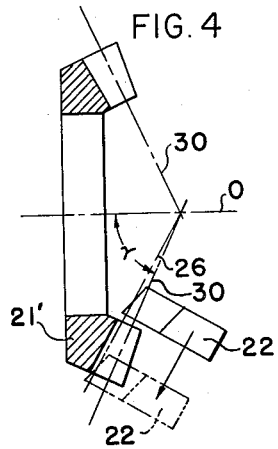
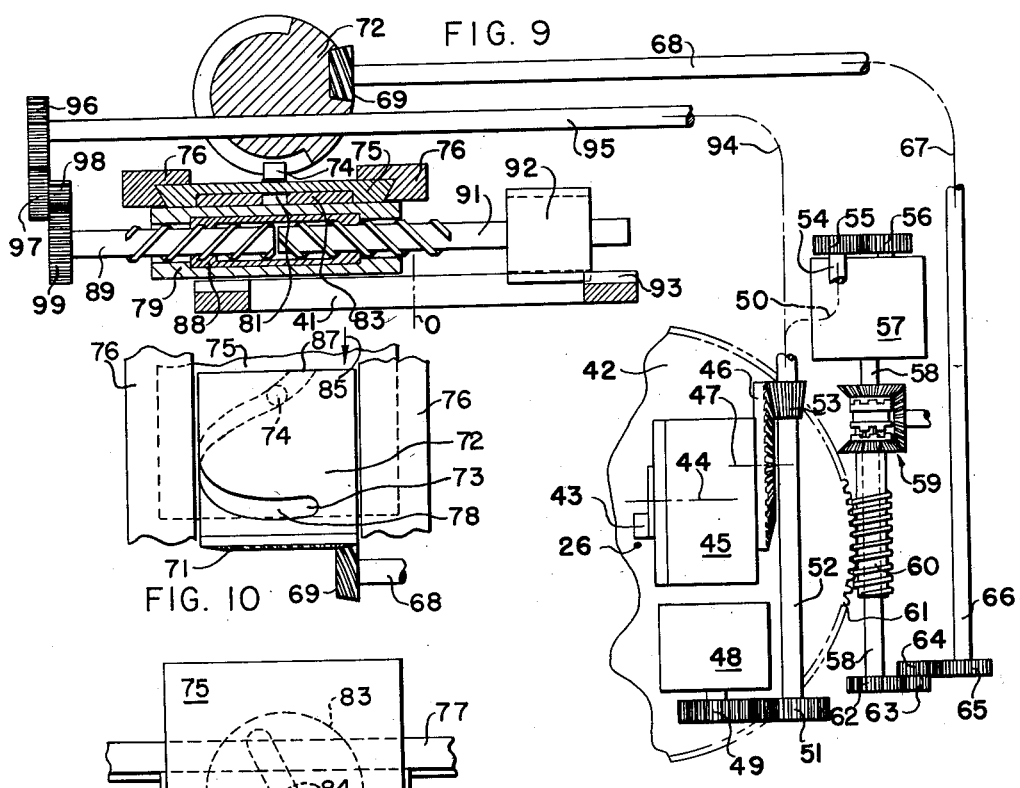
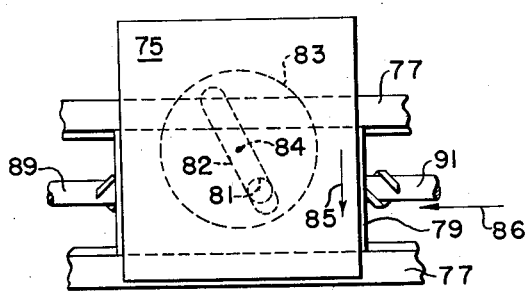
INVENTOR.
ERNEST WILDHABER
BY Richard W. Treverton
ATTORNEY

United States Patent Office 2,775,922
Patented Jan. 1, 1957

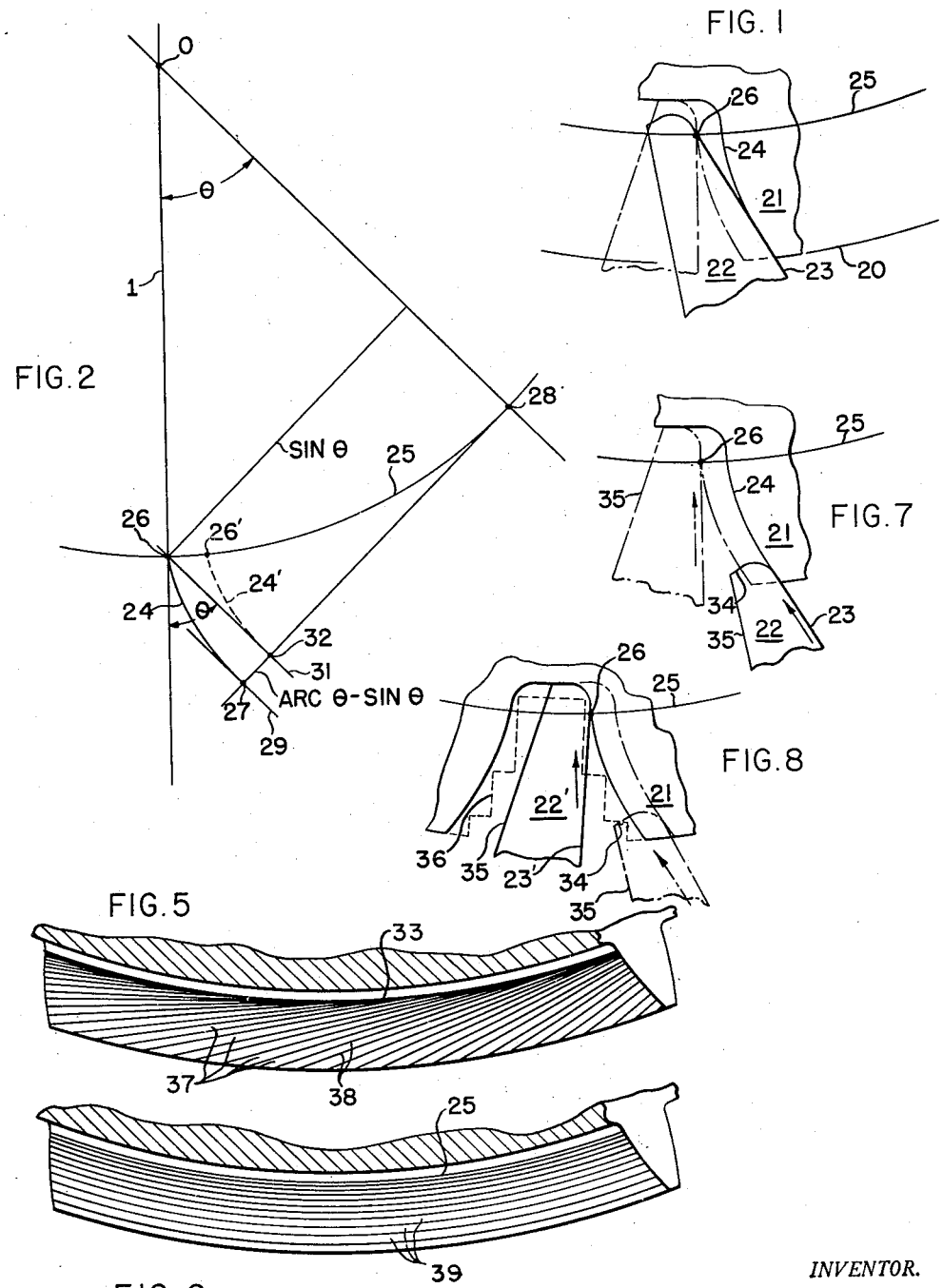

2,775,922

METHOD AND MACHINE FOR MAKING GEARS

Ernest Wildhaber, Brighton, N. Y., assignor to The Gleason Works, Rochester, N. Y., a corporation of New York Application May 25, 1951, Serial No. 228,162

25 Claims. (Cl. 90—6)

The present invention relates to a method and machine for cutting tapered gears (bevel and hypoid gears) and also cylindrical gears. The term "cutting" as used herein is intended to include not only the removal of stock by edged tools of the planer and milling cutter types but also by means of grinding wheels and other types of abrasive tools.

In conventional methods of generating gears by the relative motion of the work and cutting tool, the cutting path of the tool is made to simulate one or more tooth surfaces of an imaginary rack or gear that is caused to roll in mesh with the gear being produced. The cutting path of the tool is moved in the pitch plane of an imaginary generating rack, or is rotated around the axis of the imaginary generating gear, relative to the work gear that is being cut, while the latter turns about its axis. In the cutting of bevel gears the imaginary generating gear is a crown gear or approximately such a gear, while in the cutting of cylindrical gears it may be either a cylindrical gear or a rack.

According to the method of the present invention the path of the tool instead of being turned relative to the work gear about the axis of such an imaginary generating gear, is pivoted about an axis which lies at least approximately along the base surface of the involute. In any case the pivot axis is parallel to the root surface of the tooth space being cut, and extends inside of the imaginary surface of revolution that touches the tops of the teeth of the work gear. The pivoting of the path of the tool is in predetermined phase relationship to rotation of the work gear about its axis. This phase relationship is such that the gear turns at a decreasing rate in relation to pivoting of the tool sufficient to cause the active portion of the tool to follow the profile from the top to the root of the tooth.

When a reciprocating edged cutting tool is employed, a straight side cutting edge of the tool preferably is used for the finishing operation, giving the teeth a relatively smooth surface finish. For close roughing, the reciprocating tool may be fed radially of the axis about which it pivots so that it cuts largely with its tip, which is an efficient method of rough cutting inasmuch as a nearly uniform chip thickness is thereby attained.

In the making of gears with inclined teeth such as spiral bevel, hypoid and helical gears, the new method has the advantage that each stroke of the tool produces a cut that extends from end to end of the tooth, instead of diagonally across the tooth surface as occurs in the prior generating methods referred to hereinbefore. This enables faster gear production since fewer cutting strokes are required. Also the minute surface inaccuracies of the enveloping cuts do not affect the transmitted motion to so great an extent as in the case of diagonal cuts.

A further advantage of the new method is that the point of cutting is always very close to the axis about which the tool is pivoting in timed relation to rotation of the work gear, and accordingly any slight irregularity in the rate of turning will affect only slightly the tooth profile being produced. This is in favorable contrast to the conventional prior art generating method referred to hereinbefore where the cutting path of the tool represents a tooth of an imaginary generating gear, so that the point of cutting is much farther from the axis of the relative turning motion, with the result that any irregularity in the rate of turning affects the tooth profile to a much greater extent.

A still further advantage of the method of the present invention is that a smooth fillet of relatively large radius may be provided at the roots of the teeth. This radius may be constant from end to end of the teeth even in tapered gears in which the working surfaces of the teeth and the intertooth spaces are tapered from end to end.

Yet another advantage is that because the generating motion embraces both a turning motion of the tool about an axis extending along the tool path and a turning motion of the work gear about its axis, the method makes possible a universal machine that is capable of handling equally well tapered gears and cylindrical gears.

Also the method enables the cutting of tapered gears with small shaft angles and large cone distances without requiring a machine of a size commensurate with the cone distance.

The machine contemplated by the present invention includes a fixed support for the rotatable work carrier and a support for the cutting tool which may be adjusted to bring the pivot axis of the tool into whatever angular and space relationship to the work is necessary for cutting gears of different size, pitch angle and hypoid offset. Means are provided for reciprocating the cutting tool in the direction of its pivot axis, and for rotating the work spindle in timed relationship with at least the cutting stroke of the tool to thereby cut teeth of the desired helix angle or spiral angle. The machine also includes a generating gear train to rotate the work spindle in the predetermined relation to pivoting of the tool about its axis necessary for generation of tooth profiles, this motion of the work spindle of course being additional to or superimposed upon the rotation of the work spindle that determines the helix or spiral angle. The generating gear train includes a single profile control cam which may be used for all gears cut on the machine. In this respect the machine is basically different from conventional gear planing machines wherein the tooth profile is merely copied from a cam, so that different cams are required for cutting each different profile shape.

The use of the single profile control cam for all gears permits ready control of tooth shape, including tooth profile, by simple machine adjustments. For example any desired amount of profile ease-off may be obtained by such adjustments without modification of the cutting tool which in all cases may have a straight side cutting edge.

While the machine may be constructed as an intermittent indexing machine, which will completely cut one tooth surface before indexing to cut a succeeding tooth surface, it is preferred to arrange it for continuous indexing, in which each succeeding cut or stroke of the tool is made upon a successive tooth of the work gear, the latter being advanced by one or more teeth about its axis for each cutting stroke.

The foregoing and other objects and advantages of the invention will appear from the following description made in connection with the drawings, in which:

Fig. 1 is a fragmentary elevational view of the tool and work gear, showing their relationship in a finish cutting operation;

Fig. 2 is a diagram illustrating a geometrical principle upon which the invention is based;

Figs. 3 and 4 are diagrams showing the relationship of the cutting tool to the work when cutting cylindrical gears and bevel gears, respectively;

Fig. 5 is an elevational view of a helical gear tooth produced by a conventional generating method;

Fig. 6 is a view similar to Fig. 5 but showing a tooth produced by the method of the present invention;

Fig. 7 is a view similar to Fig. 1 but showing the relationship of tool and work gear in a roughing or semi-finishing operation;

Fig. 8 is also similar to Fig. 1 but showing a modified roughing or semi-finishing operation;

Fig. 9 is a drive diagram of the machine;

Fig. 10 is an elevational view of the profile control cam employed in the machine, and, Fig. 11 is an elevational view of means for adjusting the scale and direction of the motion produced by the profile control cam.

Referring to Fig. 1, the work gear is indicated at 21 and may first be considered to be a spur gear. The cutting tool, shown at 22, has a straight side-cutting edge 23 that is tangent to the gear tooth profile near the top of the tooth, i. e. near the imaginary surface of revolution 20 that touches the top lands of the teeth. The direction of the cutting motion of the tool, and also the direction of the axis of the work gear, is perpendicular to the plane of Fig. 1. The work gear tooth profile shown is of the shape which it has after the cutting operation, this being an involute 24 of the base cylinder indicated by circle 25. The reciprocating tool 22 has a cutting stroke as indicated by the arrow in Fig. 3, moving between the full line and broken line positions thereof. As the cutting proceeds, the work gear is turned clockwise (in Fig. 1) about its axis (the center of circle 25) and as it does so the tool is pivoted, also clockwise, about its axis 26 which also is perpendicular to the plane of Fig. 1, being an element of the base cylinder 25. The rate of pivoting of the tool about axis 26 is such that the edge 23 remains tangent to the tooth profile. The two motions may continue until the work gear and tool have reached the positions shown in broken lines, at which time the edge 23 is tangent to the involute 24 at the axis 26.

For the edge 23 to remain tangent to the involute tooth profile throughout the described motions of the work gear and the tool about their respective turning axes, it is necessary that these motions have a definite varying ratio relationship to each other. This relationship is such that for any displacement of the tool through any angle $\theta$ about its axis 26, the work gear be displaced about its axis through an arc equal to angle $\theta$ minus the sine of angle $\theta$ (in radian measure), both displacements being measured from the respective positions of the tool and work gear when the line of the tool that envelopes the tooth profile is tangent to the latter at the base surface 25. This relationship will be better understood with reference to the diagram, Fig. 2.

In this diagram the axis of the work gear is designated 0. The radius of the base circle 25 is assumed to be unity (1), and the involute curve 24 can be considered to be the path described by a point 27 on a string which is unwrapped under tension from the base circle, the point 27 being on axis 26 when the string starts to unwrap. The length of the string from the point 27 to the point 28 of tangency with the base circle is, of course, always equal to the length of the arc $\theta$ from which it is unwrapped. That is, the distance 27 to 28 is always equal to the length of arc 26—28.

The involute is normal to the string in every position during the unwinding process. Tangent 27—28 and all other tangents of the base circle are normal to the involute 24. The radius 0—28 is perpendicular to the normal 27—28 and hence is parallel to the involute tangent 29 at point 27. Line 31 has been drawn through point 26 parallel to tangent 29 and to radius 0—28; hence the angle of line 31 with radius 0—26 is equal to angle 26—0—28, both being equal to $\theta$.

As before stated the point 27 is at a distance from radius 0—28 that is equal to the length of arc $\theta$. Line 31 is at a distance from the radius 0—28 that is equal to the sine of $\theta$. Hence the distance from 27 to 32 (the point where line 31 crosses the normal 27—28) is the difference between the arc $\theta$ and the sine of $\theta$.

Line 31 can be made tangent to the involute 24 by turning the latter about its center 0. In all turning positions the tangent 27—28 remains normal of the involute. If the line 31 is rotated about 26 through angle $\theta$ until it is coincident with radius 0—26 it will be tangent to the involute 24 at point 26. If the involute is turned about center 0 to the dotted line position designated 24' where it is tangent to line 31 at point 32, its distance from its full line position 24 is the distance 27 to 32, equal to arc $\theta$ minus sine $\theta$. And, since the length of the arc from 26' to 28 is equal to the distance from 32 to 28, it follows that the involute in moving from 24 to 24' about center 0 must turn through arc $\theta$ minus the sine of $\theta$ as measured along the base circle.

It will thus be seen that an involute 24 may be enveloped by a straight line, such as line 31 in Fig. 2 or edge 23 in Fig. 1 that is turned about point 26, in a clockwise direction in these views, through any angle $\theta$ while the work gear is turned through an angle equal to $\theta$ minus the sine of $\theta$, in radian measure, both angles being measured from the final positions wherein the line 31 or edge 23 is tangent to the involute at the base circle. This angular relationship applies only in the case of a cylindrical gear whose tooth profile is a true involute. Where a modified involute profile is wanted the relationship may be changed slightly.

In cutting bevel gears the tool pivot axis 26 is an element of the base cone and hence is adjusted to intersect the work axis 0 at an angle determined by the pressure angle and the pitch angle $\gamma$ of the work gear 21'. As shown in Fig. 4 the axis 26 intersects the axis 0 at the apex of the pitch cone, this cone being designated 30. The cutting tool 22 is adjusted so that during its cutting stroke it moves in the direction of the arrow from its full line position to the position shown by broken lines.

The relationship of the angular displacements of the bevel work gear and the tool about their respective axes 0 and 26 for tooth profile generation may be determined in various ways. One way is by resort to Tredgold's approximation, commonly used in other bevel gear problems, whereby the profile of an equivalent cylindrical gear is determined from the back cone development of the bevel gear, which depends upon the pitch angle $\gamma$ of the gear.

Applying this method to the present case it is found that a turning angle ($\theta$—sin $\theta$), in radians, of the back cone development corresponds to a turning angle of the bevel gear of $$\frac{\theta - \sin \theta}{\cos \gamma}$$

in radians. Accordingly a turning angle $\theta$ of the tool about its pivot axis 26 corresponds to the above-mentioned turning angle of the bevel gear. The factor $$\frac{1}{\cos \gamma}$$

or the secant of $\gamma$, may be considered to be the taper factor, and since it is constant throughout the cutting of any one gear, it may be introduced by a suitable ratio change in the set-up of the machine. And, just as in the case of cylindrical gears, the involute profile of bevel gears may be modified as desired by slight change in this taper factor and/or by other ways of modifying profiles that are discussed hereinafter.

In cutting gears by the method described, the feed of the tool about axis 26, in timed relation to the rotation of the work gear about its axis, may be continuous as the cutting tool reciprocates, or the feed may be made intermittently, during return strokes of the tool. The indexing of the work to cut successive teeth may be either intermittent or continuous.

In cutting helical and spiral bevel gears according to the present invention, as compared with the conventional methods of generation hereinbefore referred to, there is an important saving in the number of tool strokes necessary to provide a given degree of smoothness of surface finish. In Fig. 5 is shown the kind of cuts along the tooth of a helical gear made by a machine of the type wherein the path of a reciprocating cutting tool represents a tooth surface of an imaginary generating rack or gear rolling in mesh with the work gear. Each cut produces on the tooth a facet 37 which extends tangentially from the base cylinder 33 and hence extends diagonally across the tooth face.

Adjacent facets form ridges 38 which extend above the imaginary involute surface that is enveloped by the facets, and upon the height of these ridges largely depends the smoothness and quietness of gears in operation. The height increases rapidly with increase in facet width; and the effective smoothness of surface finish is dependent upon the maximum ridge height at any place on the working area of the tooth.

As shown in Fig. 6 the facets 39 produced by the method of the present invention extend from end to end of the tooth, because all cuts are made parallel to the base cylinder 25. Therefore, and as will appear from a comparison of Figs. 5 and 6, many fewer cuts are required by the new method to produce facets of comparable width. This of course means that for the same cutting speed of the tool, gears of the same quality may be produced more rapidly by the new method.

For close rough cutting, semi-finishing, or even for finishing gears when this is done without a preliminary close roughing operation, the method illustrated in Fig. 7 may be followed. Here the tool 22 is fed radially inwardly with respect to its pivot axis 26 (in the direction of the arrows) as it is fed about that axis in the timed relationship previously described in connection with Figs. 1 and 2. Cutting by the method shown in Fig. 7 is done primarily by the tip 34 of the tool as it progresses from its full line position to the broken line position, although its side edge 23 still follows the involute profile 24. If desired the side edge of the tool may be relieved, to extend as indicated at 23' in Fig. 8 at a slight angle to the direction of radial feed which is shown by the arrows. Fig. 8 shows the tool 22' in full lines at its full depth position and in broken lines at its position wherein it is cutting near the top of the tooth profile, this being the opposite of Fig. 7 in which the tool is shown by broken lines in its full depth position. When proceeding as shown in Fig. 8 any cutting by the edge 23' of the tool is obviated. When cutting with the methods of either of Figs. 7 or 8 the radial tool feed preferably is by uniform increments, so that chips of nearly uniform thickness are cut.

In order to cut by the methods disclosed in Figs. 7 and 8, with the tip 34 of the tool, and without bringing into contact with the work the clearance edge 35 of tool, the work gear may be subjected to a preliminary slotting operation. The slots thus provided may be of the shape indicated by dotted lines 36. Such preliminary slotting is conventionally done in the manufacture of large gears, and is not a feature of novelty of the present invention.

The method may be practiced on machines having various structural and drive arrangements, one suitable drive being diagrammed in Fig. 9, this drive including means for effecting the motions necessary for tooth surface generation by the method shown in Figs. 1 and 2, but being simplified in that it shows no means for effecting the radial or depth feed of the tool that has been described in connection with Figs. 7 and 8. Shown in Fig. 9 is a work gear carrier 41 that is mounted on a suitable stationary base for rotation about the axis 0, and a tool carrier 42 that is mounted for rotation about axis 26 in a suitable support capable of being adjusted on the machine base to bring the cutting tool into the positional relationship to the work carrier that is necessary for cutting various types and sizes of gears. See for example Figs. 3 and 4. The tool 22 is mounted to reciprocate on a suitable tool slide provided on the tool carrier, such reciprocation being in the direction of the axis 26.

Reciprocation of the tool is effected by a crank 43 that is mounted on the tool carrier 42 for rotation about an axis designated 44, this crank being driven through a suitable mechanism 45 by a bevel gear 46 whose axis is designated 47. The mechanism 45, which is also mounted on the carrier 42, may be a mechanical motion of the kind disclosed in my copending application Serial No. 209,665 filed February 6, 1951, entitled "Machine for Producing Gears and Mechanical Motion Therefor." As there disclosed the mechanical motion is such that when the drive gear, here designated 46 (49 in said application) is rotated at constant velocity, the tool reciprocated by the driven crank here designated 43 (33, 35 in said application) will during its cutting stroke move at either a constant velocity or a varying velocity of a suitable nonharmonic character. For example the velocity may increase in proportion to the distance of the tool from the axis of the gear being cut. However for the purpose of the present explanation it may be considered that the cutting stroke velocity of the tool is constant.

The drive for the tool is from a motor 48, which may also be mounted on the tool carrier 42, through spur gears 49 and 51, shaft 52 and bevel pinion 53 to the bevel gear 46. The drive for pivoting the tool carrier about its axis 26 may also be actuated by the motor 48 through gears 49 and 51, shaft 52, through gearing (represented schematically by broken line 50) which connects shaft 52 to a shaft 54, spur gears 55 and 56, gear reduction unit 57, shaft 58, a reversing means 59 and worm 60 to a worm wheel segment 61 secured to the tool carrier 42.

The reversing means 59 comprises a bevel gear on shaft 58 and a coaxial bevel gear constantly rotated in the opposite direction from shaft 58 through an intermediate bevel gear. The oppositely rotating bevel gear is mounted to rotate freely on a sleeve that extends from the worm 60 to which is splined an axially shiftable coupling member. When this coupling member is shifted to engage clutch teeth on the bevel gear on shaft 58, the worm will rotate as a unit with the shaft 58. When the coupling member is shifted to engage clutch teeth on the oppositely rotating bevel gear on the sleeve, the worm 60 will rotate at the same velocity as shaft 58 but in the opposite direction.

The generating gear train, for rotating the work carrier 41 about work axis 0 in predetermined relationship to pivoting of the tool carrier about axis 26, comprises ratio change gears including drive gear 62 on shaft 58, co-rotating intermediate gears 63 and 64, and driven gear 65 on shaft 66. The shaft 54, gear reduction unit 57 and shafts 58 and 66 are mounted on the adjustable support upon which the tool carrier is pivoted for motion about axis 26. Shaft 66 is connected, through gearing (indicated schematically by broken line 67) with a shaft 68. The latter carries a hypoid pinion 69 which drives a gear 71 secured to a barrel cam 72. This cam has a track 73 engaged by a follower roller 74 that is carried by a slide 75 guided by ways 76 for movement in the direction of the cam axis. The ways 76 are stationary with respect to the machine base as also are ways 77 which guide a cross-slide 79 for motion in a direction perpendicular to the motion of slide 75. The latter carries a roller 81 engaging in a slot 82 formed in a circular plate 83 that is disposed adjustably about its axis 84 in a circular recess in the slide 75.

The arrangement is such that as the cam 72 rotates counterclockwise in Fig. 9 at constant velocity, the slide 75 will be moved at a decreasing velocity in the direction of arrows 85 in Figs. 10 and 11; and the slide 79 will be moved in the direction of arrow 86 in Fig. 11 proportionately to the motion of slide 75. What this proportion is depends upon the inclination of slot 82 and it may be varied as desired by adjusting the plate 83 about its axis 84 through suitable adjusting means (not shown). If the plate 83 is adjusted to reverse the inclination of slot 82, the direction of motion of slide 79 (arrow 86) is reversed. Mounted for rotation within slide 79 is a sleeve 88 whose opposite ends are oppositely threaded to axially aligned screws 89 and 91 that both are supported against axial motion relative to the machine base. A hypoid pinion 92 rotatable with screw 91 mates with gear teeth 93 provided on the work carrier 41 for rotating the latter. The screw 89 is rotated at constant velocity by the motor 48 through a train including gears 49 and 51, shaft 52, gearing (shown schematically by line 94) which connects shaft 52 with shaft 95, and a set of ratio change gears including a gear 96 on shaft 95, intermediate gears 97 and 98, and driven gear 99 on screw 89. The direction of rotation of the screw 89 may be reversed, for cutting gears of opposite hand of helix or spiral by inserting an idler gear between gears 98 and 99.

If the screw 89 should rotate while the slide 79 remains stationary and thereby holds the sleeve 88 against axial motion, the sleeve and also the screw 91 would rotate as a unit with screw 89. When the slide 79 moves to shift the sleeve 88 axially, the screw 91 is rotated relative to screw 89. Thus the sleeve and screw arrangement constitutes a differential gearing mechanism by means of which a varying ratio motion produced by cam 72 may be added to or superimposed upon the constant velocity ratio rotation of the screw 89 (or, conversely considered, the constant rotation is superimposed upon the varying motion), and the sum of the two motions is applied as rotation to the work carrier 41. By reversing the inclination of slot 82, the sign of the motion produced by the cam may be reversed.

The cam track 73 increases in slope from zero at the point designated 78 to a maximum at its outer open end, designated 87. From the point 78 to the closed inner end of cam track slope reverses. The shape of the cam from 78 to 87 is such that for angular displacement from point 78 through any angle corresponding to angle $\theta$ of the tool carrier the axial advance is the product of $\theta$ minus the sine of $\theta$, in radians, multiplied by any convenient constant. The track of the illustrated cam extends only partway therearound. However, with a suitable change of the gearing ahead of the cam in the generating drive train, the track may be made to extend through any desired angle, even through several turns, around the cam.

Before cutting a gear on the machine there will be installed change gears 96, 97, 98 and 99 of such ratio so that on each cutting stroke of the tool, i. e. on each rotation of crank 43, the work carrier will be rotated to advance the work gear by exactly one or more tooth spaces, and so that the tool will make one cut on each tooth before taking a second cut on the first tooth. Depending upon the hand of helix or spiral to be cut, an idler gear may or may not be arranged between gears 98 and 99. Change gears 55, 56 are installed of whatever ratio is necessary to make the number of cuts desired to envelope each tooth profile, this depending upon the degree of surface smoothness that is desired. The plate 83 is adjusted so that the slot 82 will extend in the proper direction for whichever side of the work gear teeth is to be cut. The degree of slope of slot 82 will be adjusted in accordance with the taper factor; ordinarily the movement of the slide 79 will be minimum (in relation to movement of slide 75) when cutting cylindrical gears and maximum when cutting gears of greatest pitch angle.

At the start of a finish cutting operation the tool 22 may be just out of contact with the tip of the tooth profile of the work gear (slightly beyond the position shown in Fig. 1), and accordingly the roller 74 will be somewhere between the point 78 and outer end 87 of cam track 73, being close to the end 87 in the case of pinions of low tooth number and closer to point 78 in the case of gears of large tooth number. As the operation proceeds the work gear will be advanced about axis 0 by one or more even tooth spaces for each stroke of the cutting tool, i. e. for each rotation of crank 43. Assuming that the tool velocity is constant during the cutting stroke, and that the work gear rotation is constant also, in the case of a cylindrical gear (Fig. 3) teeth of constant helix angle will be produced while in the case of a bevel gear (Fig. 4) the teeth will be of slightly increasing spiral angle from their small to their large ends. As the cutting proceeds the tool carrier 42 will slowly turn about axis 26, feeding the tool about this axis first to its full line position and then on to its broken line position in Fig. 1, and simultaneously a slow rotation will be superimposed on the work gear, advancing it first to its full line position in Fig. 1 and then on to its broken line position. When the broken line positions of the tool and work gear have been reached the roller 74 will be at point 78 on the cam track 73, and the cutting of one side of the teeth will be complete. A cutting tool 22 of opposite hand will then be installed, plate 83 will be adjusted to reverse the slope of slot 82; the turning motion of worm 60 is reversed by the reversing means 59; and after resetting the machine to position roller 74 at its starting position in the cam track 73, the other side of the work gear teeth will be cut.

The foregoing assumes that cutting is to proceed from the top to the bottom of the tooth profile. It is possible to finish cut in the opposite way, from the bottom to the top of the profile. In such case, of course, the roller 74 will be at or near point 78 of the cam 72 at the start of the operation, and the direction of rotation of the cam will be reversed, as by installing an idler gear between change gears 64 and 65.

It will be understood that the rotation imparted to the work carrier 41 by means of shaft 95, change gears 96—99, and screw 89 effects indexing of the work so that the desired number of teeth will be cut, and, to the extent that the work is rotated during the cutting stroke, determines the helix or spiral angle cut on the gear. However, between successive recurrences of any given position of the tool lengthwise along any given tooth, the amount of the rotation thus imparted is always exactly one or more whole turns of the work carrier. Hence, as respects the profile of any one tooth, the relationship of tool pivoting to rotation of the work is exactly the same as though the shaft 95 and screw 89 had no motion at all.

In the interests of simplicity there has been omitted from the description of the machine the means (such as are conventionally provided in planing machines) for withdrawing the tool from the cut during its return or idle stroke; and also the depth feed means, used for rough or semi-finish cutting in accordance with the methods described in connection with Figs. 7 and 8, whereby the tool is gradually fed into depth as the cutting proceeds. The specific form of these means is not a part of the invention claimed herein.

By the method and machine of the present invention the tooth profile that is produced may be controlled in three independent ways: (1) by a displacement of the tool pivot 26, (2) by a change in the angle of turning of the gear in relation to the angle through which the tool pivots, which may be effected by adjusting plate 83 to change the slope of slot 82, and (3) by a change in phase of the cam 72 and the work carrier 41, for example by relatively rotating shafts 58 and 66 when one of change gears 62, 63, 64, 65 is removed, which results in changing the rate at which the motions of the work and tool about the axes 0 and 26 vary. With these three independent changes there can be changed, respectively: (1) the pressure angle to shift the tooth bearing up or down on the tooth profile, (2) the profile curvature at the mean point along the profile, and (3) the rate of change of the profile curvature along the profile. Ratio change gears 62—65 permit changing the angle of rotation of cam 72 for a given angular displacement θ of the tool carrier 42. Such a change, employed in connection with one or more of the aforementioned three independent adjustments, provides the flexibility required for complete control of the tooth profile.

While I have explained the generation of bevel gears by reference to Tredgold's approximation, which reduces this problem to spur gears, it will be understood that bevel gears may also be directly treated by spherical trigonometry. Spherical involute profiles and also octoid tooth profiles may be produced. Furthermore, non-involute tooth profiles may be produced, all with the same cam 72, by using the adjustment and change features referred to hereinbefore. For example, at ratios of 2:1 and higher on bevel gears, a straight profile may be cut or ground on the gear. The pinion profile is then more curved to match the gear profile.

The foregoing description of the method and machine has been made by way of illustration and not by way of limitation, and, as those skilled in the art will recognize, various changes and modifications may be made without departing from the spirit of the invention or from the scope of the appended claims.

I claim:

1. The method of cutting a gear which comprises turning the gear about its axis and in time therewith pivoting a cutting tool which has a side cutting edge, that is adapted to follow tangentially the profile of the tooth being cut, about an axis that extends in the region of the cut within the imaginary surface of revolution that embraces the tops of the gear teeth the turning of the gear and the pivoting of the tool being at a continuously varying ratio as the tool follows the working portion of said profile.

2. The method of cutting a gear which comprises turning the gear about its axis and pivoting a cutting tool about an axis that extends in the region of the cut within the imaginary surface of revolution that embraces the tops of the teeth of the gear, the pivoting of the tool and the turning of the work being at a continuously varying ratio as the cutting profile of the tool follows the working portion of the gear tooth profile.

3. The method of cutting a gear which comprises turning the gear about its axis and in time therewith pivoting a cutting tool about an axis that extends in the region of the cut within the imaginary surface of revolution that embraces the tops of the gear teeth, the turning of the gear being at a decreasing rate in relation to pivoting of the tool as the latter follows the tooth profile from top to bottom.

4. The method of cutting a gear according to claim 3 in which the pivoting of the tool and the turning of the work are in such varying ratio that the work gear is displaced by an angle that is approximately the product of θ minus the sine of θ, in radian measure, multiplied by a constant, where θ is any angle by which the tool is displaced, the angular displacements being measured respectively from the position wherein the cutting profile of the tool is tangent to the tooth profile at the base surface of the latter.

5. The method of cutting a gear according to claim 1 in which the axis about which the tool pivots extends approximately in the direction of a straight line element of the root surface of revolution of the gear.

6. The method of cutting a gear according to claim 1 in which the axis about which the tool pivots extends in the general direction of the root surface of revolution in a plane axial of the gear.

7. The method of cutting a gear according to claim 2 in which the tool has a straight side cutting profile.

8. The method of cutting a gear of substantially involute tooth shape which comprises turning the gear about its axis and in time therewith pivoting a cutting tool about an axis that is positioned to lie at least approximately along a straight line element of the base surface of the involute and adjacent the tooth profile being cut.

9. The method of cutting a gear according to claim 8 in which the pivoting of the tool and the turning of gear are in such relationship that the gear is displaced by an angle that is approximately the product of θ minus the sine of θ, in radian measure, multiplied by a constant, where θ is any angle by which the tool is displaced, the displacement being measured respectively from the position of the tool and gear wherein the cutting profile of the tool is tangent to the tooth profile at the base surface of the latter.

10. The method of cutting a gear of substantially involute tooth profile shape with a reciprocating tool which comprises turning the work gear about its axis and pivoting the tool about an axis that extends in the direction of reciprocation of the tool and at least approximately upon the base surface of the involute and adjacent the gear adjacent the tooth profile being cut, the pivoting of the tool and the turning of the work gear being in such relationship that the active portion of the tool follows the tooth profile.

11. The method of gear cutting according to claim 10, in which said relationship is such that the work gear is displaced by an angle that is the product of θ minus the sine of θ, in radian measure, multiplied by a constant, where θ is any angle by which the tool is displaced, the displacements being measured respectively from the positions of the tool and the work gear wherein the profile of the tool that envelops the tooth profile is tangent to the latter at the base surface.

12. The method of cutting a cylindrical gear according to claim 11, in which the turning of the work gear and the pivoting of the tool are about parallel axes, and in which said constant is unity.

13. The method of cutting a tapered gear according to claim 11, in which said constant is approximately the secant of the pitch angle of the gear.

14. The method of cutting a conical gear according to claim 13, in which the axis about which the work gear is turned intersects the axis about which the tool pivots.

15. The method of cutting a gear according to claim 2, in which during each cutting stroke of the tool the work gear is given a rotary motion about its axis that is additional to the turning motion that is effected in the aforementioned relationship with pivoting of the tool.

16. In a gear cutting machine, means for supporting a work gear for rotation about its axis, means supporting a tool for cutting motion and also for pivoting about an axis that extends in the region of the cut within the imaginary surface of revolution that embraces the tops of the gear teeth, means for effecting cutting motion of the tool, and means for rotating the work gear and for pivoting the tool in a varying ratio such that the cutting profile of the tool will follow the tooth profile to be cut.

17. In a gear cutting machine, means for supporting a work gear for rotation about its axis, means supporting a tool for cutting motion and also for pivoting about an axis that extends in the region of the cut within the imaginary surface of revolution that embraces the tops of the gear teeth, means for effecting a cutting motion of the tool, and means for rotating the work gear and for pivoting the tool in timed relationship, the last mentioned means including cam means connected between the work gear and the tool for causing the angular displacement of the work gear to vary relative to that of the tool so that the cutting profile of the tool will follow the tooth profile to be cut.

18. A gear cutting machine according to claim 17, in which in the means for rotating the work gear and pivoting the tool there is a ratio change means connected between the cam means and the work gear, and another ratio change means connected between the cam means and the tool.

19. A gear cutting machine according to claim 17, in which the cam means is so proportioned that the work gear is displaced by an angle that is substantially the product of $\theta$ minus the sine of $\theta$, in radian measure, multiplied by a constant, where $\theta$ is any angle by which the tool is displaced, the angular displacements being measured respectively from the position wherein the cutting profile of the tool is tangent to the tooth profile at the base surface.

20. A gear cutting machine according to claim 19, in which there is a means to vary said constant.

21. A gear cutting machine according to claim 17, in which the tool is supported for reciprocation and the means for effecting cutting motion of the tool comprises means for reciprocating the tool, a differential mechanism is connected between the cam means and the work gear, and the means for reciprocating the tool is connected to the differential mechanism for imparting to the work gear a component of rotation additional to the aforementioned rotation in timed relationship with pivoting of the tool.

22. In a gear cutting machine, means for supporting a work gear for rotation about its axis, means supporting a tool for reciprocation across the face of the work gear and also for pivoting about an axis that extends in the direction of the reciprocation, means for reciprocating the tool, a generating drive train connecting the tool and the work gear for effecting pivoting of the tool in time with rotation of the work gear, cam means in said train for effecting rotation of the work gear in a decreasing proportion to pivoting of the tool as the latter follows the tooth profile from top to bottom, a differential mechanism in said train, and the means for reciprocating the tool being connected to the differential for imparting to the work gear a component of rotation additional to the aforementioned rotation in timed relationship with pivoting of the tool, said component of rotation imparted by the means for reciprocating the tool being such that the work gear is advanced by one or more teeth for each reciprocation of the tool.

23. A gear cutting machine according to claim 22 in which the cam means is so proportioned that for displacement of the tool through any given angle there is imparted to the work gear a component of rotation through an angle that is substantially the product of said given angle minus the sine of said given angle, in radians, multiplied by a constant, the angles being measured respectively from the position wherein the cutting profile of the tool is tangent to the tooth profile at the base surface.

24. In a gear cutting machine, a rotatable work gear support, a pivoted tool carrier, a tool reciprocable on the carrier in the direction of the tool carrier pivot axis, means for reciprocating the tool, and means for rotating the work gear and pivoting the tool carrier in a continuously varying ratio during the cutting of the active portions of the gear tooth profiles.

25. In a gear cutting machine, a rotatable work gear support, a pivoted tool carrier, a tool reciprocable on the tool carrier in the direction of the tool carrier pivot axis, means for reciprocating the tool and imparting a component of rotation to the work gear support in such constant velocity ratio that during successive cutting strokes the tool acts on different teeth of a work gear, and means for pivoting the tool carrier and imparting a further component of rotation to the work support in such varying velocity ratio that the cutting profile of the tool follows the tooth profile of the work gear.

References Cited in the file of this patent

UNITED STATES PATENTS

| | | |
|---|---|---|
| 497,997 | Wilkin | May 23, 1893 |
| 1,830,971 | Taylor | Nov. 10, 1931 |
| 2,423,286 | Barnes | July 1, 1947 |
| 2,473,233 | Whitfield | June 14, 1949 |

FOREIGN PATENTS

| | | |
|---|---|---|
| 930,953 | France | Sept. 8, 1947 |